United States Patent
Bhatia et al.

(10) Patent No.: US 7,433,315 B2
(45) Date of Patent: Oct. 7, 2008

(54) METHOD FOR FAST NETWORK RE-OPTIMIZATION

(75) Inventors: Randeep S. Bhatia, Somerset, NJ (US); Muralidharan Sampath Kodialam, Marlboro, NJ (US); Tirunell V. Lakshman, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 848 days.

(21) Appl. No.: 10/753,796

(22) Filed: Jan. 7, 2004

(65) Prior Publication Data

US 2005/0147031 A1    Jul. 7, 2005

(51) Int. Cl.
- H04J 1/16      (2006.01)
- H04J 3/14      (2006.01)
- H04L 1/00      (2006.01)
- H04L 12/26     (2006.01)
- H04L 12/28     (2006.01)
- H04L 12/56     (2006.01)

(52) U.S. Cl. .................. 370/237; 370/238; 370/351; 370/400

(58) Field of Classification Search ............... 370/237, 370/238, 351, 400, 229, 238.1, 235, 231–234, 370/230.1, 230, 352–356, 395.41, 395.32, 370/395.21; 709/239–242
See application file for complete search history.

(56) References Cited

U.S. PATENT DOCUMENTS

| | | | |
|---|---|---|---|
| 6,999,420 B1 * | 2/2006 | Chiu et al. | 370/231 |
| 2002/0071392 A1 * | 6/2002 | Grover et al. | 370/241 |
| 2004/0151130 A1 * | 8/2004 | Beshai et al. | 370/254 |
| 2005/0041590 A1 * | 2/2005 | Olakangil et al. | 370/238 |

* cited by examiner

Primary Examiner—Firmin Backer
Assistant Examiner—Farah Faroul (57) ABSTRACT

A fast and efficient method for network re-optimization is described. In one embodiment, the technique uses an algorithm that requires limited aggregate information to continually monitor the network for re-optimization opportunities. The re-optimization of the present invention enables a network to accommodate more traffic without adding capacity. The re-optimization of the present invention is performed only when network efficiency benefits above a predetermined threshold may be obtained. In addition, a least-cost set of sessions is determined to perform the re-routing of the present invention to attain the desired network efficiency.

19 Claims, 4 Drawing Sheets

METHOD FOR FAST NETWORK RE-OPTIMIZATION

FIELD OF THE INVENTION

This invention relates to the field of communications networks and, more specifically, to the optimization of traffic among the paths of communications networks.

BACKGROUND OF THE INVENTION

Typically in next generation networks data sessions are carried over pre-reserved paths, such that the establishment of a data session involves a reservation phase where resources for the session are allocated and then held for the duration of the session and are released once the session is terminated. Some examples of such networks include MPLS, Optical and ATM networks.

In general, the resource allocation for paths for the sessions of a network is performed by individual edge elements of these networks which perform this allocation under limited global network information using simple algorithms (e.g. constrained-shortest-path-first (CSPF)), thus not necessarily leading to optimal use of network resources. In addition as sessions are terminated and resources released, the current resource allocation for the remaining sessions may not stay optimal. Many of these types of networks do, however, support opportunistic re-routing where network resources are reallocated by the edge elements for the existing sessions if it leads to a better use of the resources under some measure. Unfortunately, this re-allocation is performed under limited global network information using simple algorithms (e.g., CSPF).

In other prior art schemes, powerful off-line route servers with a global knowledge of the network perform online or offline routing of the sessions of a network. These schemes, however, generally implement heavy duty machinery, such as Linear Program solvers, thus imposing a heavy burden on the underlying computational infrastructure.

SUMMARY OF THE INVENTION

The present invention advantageously provides a method and apparatus for network optimization that enables a network to admit as many sessions as possible wherein every source-sink pair is allotted a fair share of a total flow and the total amount of the flow is substantially optimal. In accordance with the concepts of the present invention, a substantially minimum number of re-routings is performed to accomplish the network optimization of the present invention.

In one embodiment of the present invention, a method of network re-optimization includes determining a network efficiency for a set of links of a source-sink pair, determining a network re-optimization benefit for the set of links of the source-sink pair, and if a ratio of the network re-optimization benefit to the network efficiency is greater than a predetermined threshold, rerouting network sessions having at least one link in common with the source-sink pair to optimize a traffic flow such that each source-sink pair of the network sessions is allotted a proportionate share of a total traffic flow. The method of the network re-optimization is performed such that a substantially minimum number of re-routings is performed to accomplish the network optimization of the present invention.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Although various embodiments of the present invention herein are being described with respect to edge routers, it should be noted that the edge routers are provided as a working environment for specific embodiments of the present invention and should not be treated as limiting the scope of the invention. It will be appreciated by one skilled in the art informed by the teachings of the present invention that the concepts of the present invention may be applied in substantially any edge element or off-line network element to be used for the optimization of networks.

Figure 1:
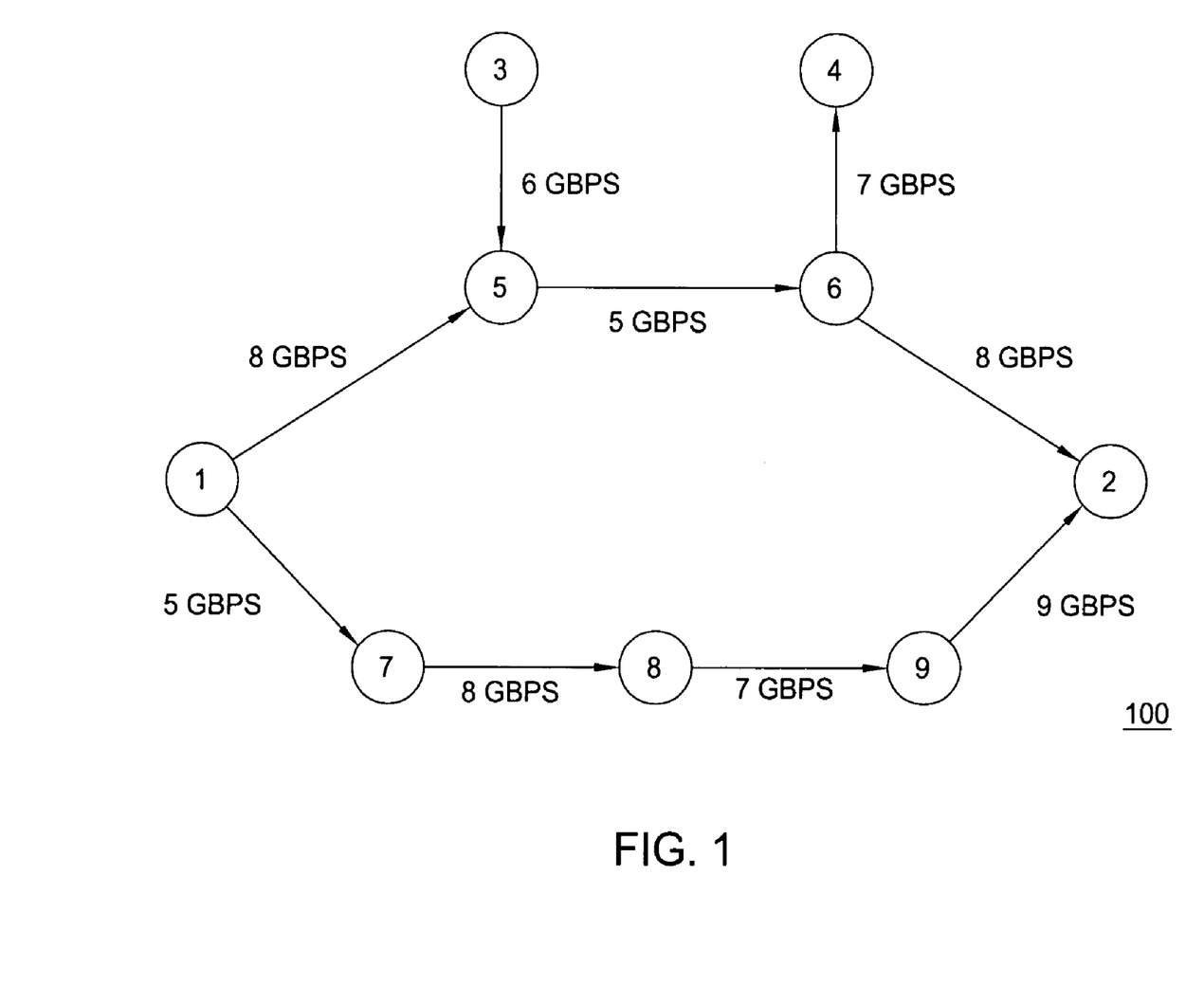
FIG. 1 depicts a high level block diagram of a network wherein an embodiment of the present invention may be applied.

Session-oriented networks that use online routing tend to get unbalanced over time resulting in uneven load distribution. This may lead to some links getting congested that are "critical" for carrying some future demands. Re-optimization involves balancing the load on the links such that network congestion is alleviated. For example, FIG. 1 depicts a high level block diagram of a network 100 wherein an embodiment of the present invention may be applied. The network 100 of FIG. 1 illustratively comprises nine nodes 1-9. The capacity of each of the links between the nodes 1-9 is depicted in FIG. 1. For clarity of explanation, the network 100 of FIG. 1 is considered to implement min-hop routing and use 1 Mbps of bandwidth for each session. In addition in the network 100, accomplished sessions are considered to last for a long time. Thus a session once provisioned stays provisioned in the network 100 substantially permanently. In the network 100 nodes 1 and 3 illustratively comprise ingress routers and nodes 2 and 4 illustratively comprise egress routers.

For the case of a demand being received by the network 100 for a session from node 1 to node 2 of bandwidth 1 Mbps, the demand will be routed over the path 1, 5, 6, and 2 since this is the min-hop path between node pair (1, 2). In fact all sessions for node pair (1, 2) will be routed over the path 1, 5, 6, 2 until a link on this path runs out of available capacity. Subsequently additional sessions for node pair (1, 2) will be routed over path 1, 7, 8, 9, 2. On the other hand, sessions for the node pair (3, 4) have only one choice. These demands can only be routed over path 3, 5, 6, 4. Note that link (5, 6) is one of the critical links for the sessions for node pair (3,4) and as long this link has available capacity all the newly arrived sessions, for both node pairs, (1, 2) and (3, 4), will be routed over this link. At the same time, other links, such as those on path 1, 7, 8, 9, 2 remain unloaded. Thus assuming a uniform mix of sessions for the two node pairs, (1, 2) and (3, 4), over time the network 100 would get unbalanced.

Consider a scenario where the network 100 is to support 5000 sessions for each of the node pairs. For example, assume that at some time, $t_1$, 2500 session demands for each of the node pairs (3, 4) and (1, 2) have arrived and been provisioned in the network 100. Because sessions for node pair (3, 4) are routed over the path 3, 5, 6, 4 while those for node pair (1, 2) are routed over the path 1, 5, 6, 2, the link (5, 6) is loaded to its full capacity and no more sessions can be accommodated in the network 100 for node pair (3, 4). Note that this is not due to the network 100 not having enough capacity to admit any more sessions for node pair (3, 4), but is due to the load imbalance which results in capacity getting stranded in the network. This stranded capacity can be recovered by re-balancing the network in accordance with the present invention.

In one embodiment of the present invention, re-optimization involves changing the sessions for node pair (1, 2) from the path 1, 5, 6, 2 to the path 1, 7, 8, 9, 2, thus alleviating the congestion on the link (5, 6). As such, enough capacity is created in the network to accommodate 2500 more sessions for node pair (3, 4). If the re-optimization described above is performed at time $t_1$ and then subsequently at some time, $t_2$, 1000 additional sessions for each of the node pairs (3, 4) and (1, 2) are received by the network 100, the additional sessions for node pair (3, 4) are routed over the path 3, 5, 6, 4 while those for node pair (1, 2) are routed over the path 1, 5, 6, 2. As such, the network 100 can only admit 500 more sessions for node pair (3, 4). However by performing another re-optimization in accordance with the present invention where all of the (1, 2) sessions are migrated from the path 1, 5, 6, 2 to the path 1, 7, 8, 9, 2, enough capacity is created to accommodate 1500 additional sessions for node pair (3, 4). The example above illustrates how periodic re-optimization of the session oriented network 100 recovers the stranded capacity and keeps the network 100 balanced.

However, the re-optimization of the present invention has a cost associated with it in terms of the disruption of provisioned sessions possibly resulting in traffic hits. Thus re-optimization has to be carefully planned to maximize the benefits gained in terms of the recovered stranded capacity. To accomplish this, a "network efficiency" measure is defined. A network efficiency is computed before and after (a potential) re-optimization. If re-optimization can lead to a significant gain in the network efficiency, the re-optimization is performed. Otherwise, the current state of the network is not altered.

For exanple, given the state of the network at time $t_1$ (i.e., 5000 sessions for each of the node pairs), the fraction of the demand matrix that can be accommodated by the network must be determined. In the network 100, 2500 sessions existed for each node pair (3, 4) and (1, 2) and, as such, the network 100 could not accommodate any more sessions for the first node pair (3, 4). Thus the fraction of the demand matrix is $2500/5000=0.5$. Thus the network efficiency of the network 100 at time $t_1$ is 0.5. However, upon the re-optimization of all of the sessions provisioned on the path 1, 5, 6, 2 to the path 1, 7, 8, 9, 2, the network 100 can accommodate a total of 5000 sessions for each of the node pairs (assuming an optimal routing algorithm is used for routing the additional sessions) because all of the sessions for the node pair (1, 2) were re-routed on the path 1, 7, 8, 9, 2 and all of the sessions for the node pair (3, 4) remain routed on the path 3, 5, 6, 4. As such, the network efficiency after re-optimization is $5000/5000=1.0$ (a gain of 100%).

The concepts of the present invention are developed for a generic network model by the inventors as described herein.

A network model wherein an embodiment of the present invention may be applied comprises a plurality of routers (also known as nodes) having a plurality of links between them. Each of the routers of the network model are assumed to include at least a memory for storing control programs and instructions and a processor for executing the programs and instructions to perform the network re-optimization of the present invention. The processor of the routers cooperates with conventional support circuitry, such as power supplies, clock circuits, cache memory and the like as well as circuits that assist in executing the software routines stored in the memory. As such, it is contemplated that some of the process steps discussed herein as software processes may be implemented within hardware, for example, as circuitry that cooperates with the processor to perform various steps.

The generic network model proposed by the inventors illustratively supports demands between n source-sink router pairs (i,j) where each source and sink router is, illustratively, an edge router. These source-sink pairs are numbered 1 to n and for the k-th source-sink pair (i, j) there is currently $d_k$ amount of end to end demand provisioned in the network. This demand for a source-sink pair is measured by the aggregate bandwidth allocated to all the label-switched paths (LSPs) between the source-sink pair. The currently provisioned demand between source-sink pair (i,j) is denoted by $d_{(i,j)}$. In addition $D_{(i,j)}$ or $D_k$ denote the total desired demand to be supported for the k-th source-sink pair (i,j) as defined by a demand matrix D. For each link, e, in the network c(e) and b(e) denote the current residual capacity and the total capacity, respectively, of the link.

In the network model, the demand matrix is defined by the currently provisioned demands between source-sink pairs and the Network Efficiency Measure is used to maximize the minimum fraction of demands accommodated for every source-sink pair. Thus, $D_{(i,j)}=d_{(i,j)}$ and the Network Efficiency Measure is the largest value for $\lambda$ such that at least the $\lambda d_{(i,j)}$ demand can be accommodated between source-sink pair (i,j).

In the network model, a Network Efficiency Measure is considered before re-routing of the network 100 wherein the network has $d_{(i,j)}$ currently provisioned demands between source-sink pairs (i,j). Assuming that the currently provisioned flows stay as they are, the additional flow that can be routed between each source-sink pair is computed. The efficiency of the network is measured by the maximum value of $\lambda+1$, where there exist a multi-commodity flow between every source-sink pair such that the flow assigned in this multi-commodity flow to source-sink pair (i,j) is $d_{(i,j)}\lambda$ and the total flow through any link, e, is at most c(e). Thus if the efficiency is represented by r, then the flow between every source-sink pair may be increased by a factor of r−1. Note also that $r \geq 1$ and the larger r is, the more "efficient" the network is in admitting new sessions between any source-sink pair. The currently provisioned demand matrix is being implemented as a measure for the expected demand in the future to within a multiplicative factor such that the demand ratios for future demands may be expected to follow the ratios in the current demand matrix.

Each source-sink edge router pair in the network is assumed to be associated with a single commodity. The flow for commodity k for the k-th source-sink pair on path P is denoted by $f^k(P)$. As such, $\lambda$ may be determined as a solution to the following multi-commodity concurrent flow problem depicted in equations (1-4), which follow:

$$\max \lambda \qquad (1)$$

$$\sum_{k=1}^{n} \sum_{P: e \in P} f^k(P) \le c(e) \; \forall \, e \in E \qquad (2)$$

$$\sum_{P} f^k(P) = \lambda \, d_k \; \forall_k \qquad (3)$$

$$f^k(P) \ge 0 \forall P \forall_k \qquad (4)$$

A Network Re-optimization Benefit Measure measures the maximum network efficiency that can be obtained by re-routing the existing demands in a network. More specifically, the Network Re-optimization Benefit Measure is the maximum value of $\lambda$ where there exist a multi-commodity flow between every source-sink pair such that the flow assigned in this multi-commodity flow to source-sink pair (i,j) is $d_{(i,j)}\lambda$ and the total flow through any link, e, is at most b(e). Thus if b is the network re-optimization benefit, then note that b/r≧1 and that by re-routing the existing demands, the efficiency of the network can be increased by b.

The value of b=$\lambda$ is obtained as a solution to the following multi-commodity concurrent flow problem depicted in equations (5-8), which follow:

$$\max \lambda \qquad (5)$$

$$\sum_{k=1}^{n} \sum f^k(P) \le b(e) \; \forall \, e \in E \qquad (6)$$

k=1 P:e∈P $$\sum_{P} f^k(P) = \lambda \, d_k \; \forall_k \qquad (7)$$

$$f^k(P) \ge 0 \forall P \forall_k \qquad (8)$$

Along with a value for the Network Re-optimization Benefit Measure, a threshold, $\alpha$, is used which is used to determine if network re-optimization is beneficial. That is, a threshold level, $\alpha$, is used to determine that it is beneficial to perform the network optimization of the present invention if the ratio of the network re-optimization benefit measure, b, to the network efficiency measure, r, exceeds $\alpha$. An important aspect of the present invention is to perform re-routing such that the efficiency of the optimized network is substantially equal to r $\alpha$. Even further, another aspect of the present invention is to improve the network efficiency while performing substantially minimum cost re-routing. It would seem that these two concepts are contradictory since minimum cost re-routing implies least network efficiency and vice versa; however the present invention increases the efficiency of a network to approach r$\alpha$ while determining the minimum cost re-routing that achieves that desired network efficiency.

In accordance with the present invention, an operator assigns a cost-benefit measure down to the level of individual LSPs for selecting a re-routing solution of minimum cost. For example, let $\chi^k(P)$ denote the amount of commodity, k, currently provisioned on path P. Let $LSP_k$ denote the set $\{(P,k): \chi^k(P)>0)\}$. $LSP_k$ is defined by the inventors as some operator specified splitting of the flow for commodity k in the existing network. An ordering of the elements of $LSP_k$ is assumed such that the i-th element is denoted by the tuple (k, i) and corresponds to the flow for the commodity k on path $P_i$. Furthermore, LSP is chosen to denote the union of the n sets $LSP_k$.

A profit associated by an operator for the flow of commodity k that is routed (not routed) on path P in any re-routing is denoted by $p^k(P)$ (cost $c^k(P)$). Specifically, if a fraction, f, of the total flow for commodity k for which $\chi^k(P)>0$ is kept on path P by the re-routing fraction (i.e., fraction 1−f is re-routed onto other paths) than a profit of $f p^k(P)$ (cost of $(1-f) c^k(P)$) is earned for the commodity in the re-routing.

In an embodiment of the present invention, a profit-based method is presented for determining a re-routing solution that maximizes the total profit earned for the desired network efficiency. The inventors developed a max profit multi-commodity linear program by splitting a commodity, k, into $|LSP_k|+1$ commodities, such that among the first $|LSP_k|$ commodities, the i-th commodity can only be re-routed on path $P_i$ for a total flow which is at most $\chi^k(P_i)$. Here $P_i$ is the path for the i-th pair in $LSP_k$. As such, the flow for the i-th such split commodity is denoted by $f^k_{P_i}$. The flow on the path, P, for the ($|LSP_k|+1$)-th commodity into which the commodity, k, is split is denoted by $f^k(P)$. In this embodiment of the present invention, the total flow for all of the $|LSP_k|+1$ commodities is required to be substantially equal to r$\alpha d_k$. One aspect of the present invention is to maximize the total profit where a profit of $p^k(P_i) \cdot f^k_{P_i}/\chi^k(P_i)$ is obtained for the i-th split commodity ($1 \le i \le |LSP^k|$).

An embodiment of such a linear program as described above may be characterized according to equations (9-14), which follow:

$$\max \sum_{k=1}^{n} \sum_{P:(P,k) \in LSP_k} \frac{p^k(P)}{\chi^k(P)} - f^k_P \qquad (9)$$

$$\sum_{k=1}^{n} \sum_{P: e \in P(P,k) \in LSP_k} f^k_P + \sum_{k=1}^{n} \sum_{P: e \in P} f^k(P) \le b(e) \; \forall \, e \in E \qquad (10)$$

$$\sum_{P:(P,k) \in LSP_k} f^k_P + \sum_{P} f^k(P) = r \alpha \, d_k \; \forall \, k \qquad (11)$$

$$f^k(P) \ge 0 \forall P \forall k \qquad (12)$$

$$f^k_P \ge 0 \forall P \forall k \qquad (13)$$

$$f^k_P \le \chi^k(P) \forall P \in \{p:(p,k) \in LSP_k\} \qquad (14)$$

Although the linear program depicted by equations (9-14) above is configured to determine a re-routing solution of maximum profit among all re-routing solutions that achieve a network efficiency of exactly r$\alpha$, its profit is also no less than the profit of any re-routing solution that achieves a network efficiency of at least r$\alpha$. More specifically, the above linear program determines a re-routing of the flows such that a newly routed network has an efficiency of r$\alpha$ and the re-routing profit is maximized among all re-routings that achieve a network efficiency of at least r$\alpha$.

It should be noted that a feasible solution exists to the linear program depicted by equations (9-14) above since the network efficiency measure, r, and the network optimization benefit measure, b, are such that b/r>α. Thus there exists a feasible solution which achieves network efficiency b>rα and by appropriately reducing the flows between every source-sink pair, the efficiency can be reduced to be substantially equal to rα. For example, for a re-routing, R, that achieves a network efficiency at least equal to rα and maximizes the total profit, if there exists a re-routing, R', with the same profit value and that has network efficiency exactly equal to rα, then the solution found by the linear program must also be optimal. Otherwise, for the optimal solution, R, the flow can be continuously decreased on each of the paths that is not contained in the LSP until either the network efficiency of the solution, R, equals rα or until some commodity k and some path P∈LSP for which the profit $p^k(P)>0$, has positive residual bandwidth (on all its edges) in R. The former is not possible because otherwise there exists a re-routing solution, R', of the same profit as the optimal solution, R, and has network efficiency exactly equal to rα. The latter is also not possible since it allows the increase of the flow for commodity k on P in such a way that all the edge capacity constraints are satisfied resulting in a solution of better profit than the optimal solution, R. As such, there is an implication that the linear program of the present invention depicted above finds a solution of maximum profit among all solutions of network efficiency at least equal to rα.

In an alternate embodiment of the present invention, a cost-based method is presented for determining a re-routing solution that achieves the re-optimization of the present invention. The cost-based method is based on solving a budgeted version of the maximum concurrent flow problem described above. In this embodiment of the present invention, each commodity k is split into $|LSP_k|+1$ commodities such that the i-th commodity among the first $|LSP_k|$ commodities corresponds to the i-th tuple, $(k, i) \in LSP_k$. The demand for the i-th commodity among the first $|LSP_k|$ commodity, denoted by (k, i), is set to $\chi^k(P_i)/(r\alpha)$. The demand for the $|LSP_k|+1$-th commodity, denoted by $(k,|LSP_k|+1)$, is characterized according to equation (15), which follows:

$$d_k - \sum_{(k,i)} \chi^k(P_i)/(r\alpha) = d_k(1 - 1/(r\alpha)). \quad (15)$$

Unlike in the profit-based solution depicted in the first embodiment of the present invention, the i-th commodity in this embodiment, denoted above by (k, i) for $i \leq |LSP_k|$, may be routed onto any path. However for any flow not routed on path $P_i$, a cost per unit flow of $c^k(P_i)/\chi^k(P_i)$ is incurred. For some total cost budget, B, a maximum concurrent multi-commodity flow problem is solved for the commodities subject to the budget, B. As previously stated, one object of the present invention is to determine the smallest value of the budget, B, such the solution to the maximum concurrent flow problem is substantially equal to $\lambda=r\alpha$. With these factors in mind, a solution for a budgeted maximum may be characterized by solving the following multi-commodity concurrent flow problem depicted by equations (16-20), which follow:

$$\max \lambda \quad (16)$$

$$\sum_{k=1}^{n} \sum_{i=1}^{|LSP_k|+1} \sum_{P: e \in P} f^{(k,i)}(P) \leq b(e) \; \forall \, e \in E \quad (17)$$

$$\sum_{P} f^{(k,i)}(P) = \lambda d_{(k,i)} \; \forall \, k \; 1 \leq i \leq |LSP_k|+1 \quad (18)$$

$$f^{(k,i)}(P) \geq 0 \, \forall P \forall k 1 \leq i \leq |LSP_k|+1 \quad (19)$$

$$\sum_{k=1}^{n} \sum_{i=1}^{|LSP_k|} \frac{c^k(P_i)}{\chi^k(P_i)} \sum_{P \neq P_i} f^{(k,i)}(P) \leq B \quad (20)$$

In the equations above, $f^{(k,i)}(P)$ denotes the flow for commodity (k, i) on path P and $d_{(k, i)}$ denotes the demand for commodity (k, i). It should be noted that above $c^k(P_i)f$ is the cost incurred for routing a fraction (i.e., 1−f) of the currently provisioned flow on path $P_i$ for commodity k. As such, there exists a value of B for which the optimal solution is substantially equal to rα. For example, let g(B) be a function that determines the optimal solution to the budgeted LP for a given value of the budget constraint, B. The function g(B) is continuous and is monotonically non-decreasing in B, since from a flow scaling argument it follows that for B'≦B, g(B')≧g(B) B'/B. If B is set to its maximum value characterized according to equation (21), which follows:

$$\sum_{k=1}^{n} \sum_{i=1}^{|LSP_k|} c^k(P_i) \quad (21)$$

then λ=rα is a feasible solution to this budgeted LP. Thus, for this choice of B, g(B)≧rα. Also if B is set to 0 then λ=rα is not a feasible solution to the budgeted LP, because, as such, even without re-routing the network efficiency will be substantially equal to rα. Thus, for this choice of B, g(B)<rα. Thus by continuity of g(B), there exists a B for which g(B)=rα. Also, such a B can be approximated to a high degree of precision using binary search.

In the embodiments above, the flows for a commodity at the granularity of the paths which define the set $LSP_k$ have been discussed and examined. In general, however, for each path, P, wherein $(P,k) \in LSP_k$, multiple LSPs (sessions) exist for a commodity, k, provisioned on it. As previously mentioned, one aspect of the present invention is to determine a re-routing for these sessions so as to maximize a total profit. For achieving this aspect of the present invention, the solutions of the linear programs given by the constraints of equations (9-14) or the constraints given by equations (16-20) are implemented.

In various embodiments of the present invention, the overall method (algorithm) for re-routing the sessions implements at most four phases. A first phase involves solving the multi-commodity flow problems as described above. In a second phase, a set of sessions that do not need to be re-routed are determined. Such sessions are not re-routed because they are currently routed over a path on which sufficient flow is routed by the multi-commodity solution. The sessions are selected in a priority order which can be modified by an operator. As sessions are assigned to a path, the flows on the paths are updated to reflect the capacity that is used by the assigned sessions. A third phase is a re-routing phase where unassigned sessions are assigned to paths on which enough flow was routed in the linear program solution (and as updated by phase two) to accommodate new sessions. In the third phase, the method selects the sessions to be re-routed in an order defined by their priorities and attempts to assign selected sessions to a first path in which they can be accommodated (i.e., the path has enough flow associated with it for the source-sink pair of the session to accommodate the new session). Once again, as sessions are assigned to a path, the flows on the paths are updated to reflect the capacity that is used by the assigned sessions. A fourth phase is required if not all sessions are assigned by the first three phases. This phase involves re-routing the remaining, un-assigned sessions by using constrained-shortest-path-first (CSPF) over a residual graph resulting from phase three.

Note that the re-routing method described above requires the knowledge of the currently provisioned sessions on each path for each commodity. This knowledge is available on edge routers corresponding to a source-sink pair for each of the commodity, k. The edge router for the commodity, k, needs to know the flows, $f^{k,i}{}_P$ for each $(P_i,k) \in LSP_k$. Therefore, such a method may be implemented in the edge routers of a network. As such, a route server does not need to have information about all the sessions that are provisioned in the network and may gather all the information it needs to solve the linear programs of the present invention by passively peering with the Open Shortest Path First (OSPF-TE) protocol and/or looking into the network management information base (MIB) elements, both capable of being accomplished using methods known in the art and as such will not be described in detail herein.

In general, various embodiments of the re-routing based optimization of the present invention operate as follows:

a) solve the linear program given by equations (1) to (4) to obtain the network efficiency, r; b) Solve linear program given by equations (5) to (8) to obtain the network re-optimization benefit measure, b; c) If the ratio of the network re-optimization benefit measure b and the network efficiency measure r is at least α then proceed with re-optimization. d) Re-optimization is performed by solving the linear program given by equations (9) to (14) or equations (16) to (20), and then re-routing sessions based on the solution of the chosen linear program.

Figure 2:
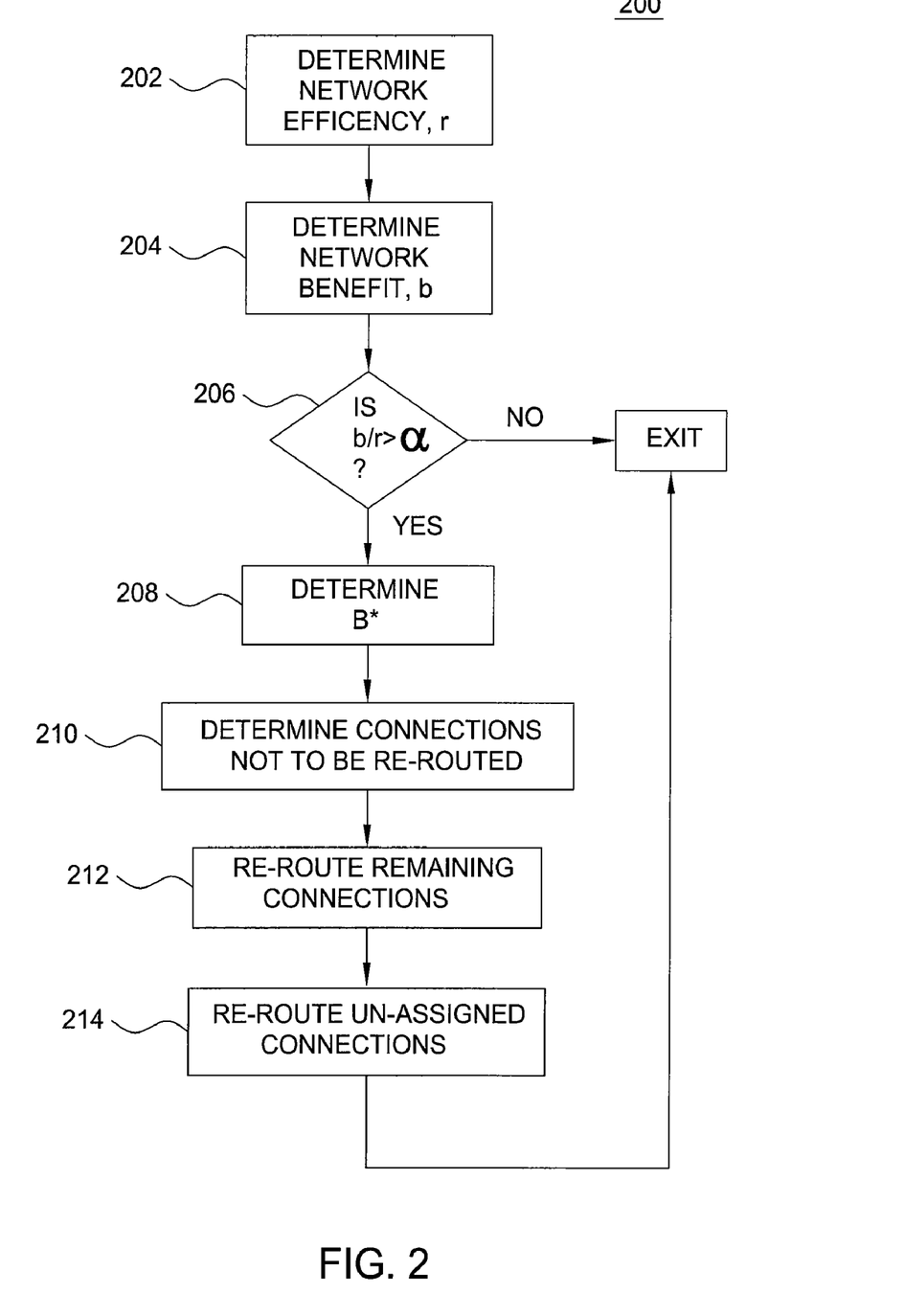
FIG. 2 depicts a high level block diagram of an embodiment of a method for re-optimization in accordance with the present invention.

For example, FIG. 2 depicts a high level block diagram of an embodiment of a method for re-optimization in accordance with the present invention. The method 200 of FIG. 2 begins at step 202. At step 202, a network efficiency, r, for a network to be re-optimized is determined using equations (1-4) presented above. The method then proceeds to step 204.

At step 204, a network re-optimization benefit, b, is determined using equations (5-8) presented above. The method then proceeds to step 206.

At step 206, the determined network re-optimization benefit, b, is divided by the determined network efficiency, r. If the ratio of the network re-optimization benefit, b, to the network efficiency, r, is less than a predetermined threshold, α, then the method 200 is exited because re-optimization is determined to be not beneficial. If the ratio of the network re-optimization benefit, b, to the network efficiency, r, is greater than a predetermined threshold, α, then the method proceeds to step 208.

At step 208, the value of B* is determined. B* is equal to the value of the budget, B, defined by, for example, equations (16-20) above, for which λ=rα. At step 208, the values for $f^{(k,i)}(P)$ and $f^k(P)$ are also determined by, for example, equations (16-20) above. The method then proceeds to step 210.

At step 210, the sessions that are not to be re-routed are determined. An example of a method for determining the sessions that are not to be re-routed may be found at the end of this specification as Phase 2 of an attached algorithm labeled Appendix 1. More specifically, at step 210, for k=1 to n and for sessions $s_i=s_1, s_2 \ldots$ of k-th source-sink pair, P depicts the path for $s_i$. As such, if the bandwidth, $b_i$, for the session, $s_i$, is less than $f^k(P)$, then $s_i$ remains routed on P. The method 200 then proceeds to step 212.

At step 212, the remaining sessions are re-routed in accordance with the present invention. An example of a method for re-routing the remaining sessions may be found at the end of this specification as Phase 3 of a provided algorithm labeled Appendix 1. More specifically, at step 212, for k=1 to n and for sessions $s_i=s_1, s_2 \ldots$ of k-th source-sink pair, for paths $P_j=P_1, P_2, \ldots$ between the k-th source-sink pair, if the bandwidth, $b_i$, for the session, $s_i$, is less than $f^k(P_j)$, then route $s_i$ on $P_j$. The method 200 then proceeds to step 214.

At step 214, any un-assigned sessions are re-routed in accordance with the present invention. An example of a method for re-routing un-assigned sessions may be found at the end of this specification as Phase 4 of a provided algorithm labeled Appendix 1. More specifically, at step 214, for i=1 to r, CSPF is used to route session $s_i$ over the residual network. The residual network is then updated. The method 200 is then exited.

In an alternate embodiment of the present invention, a more general demand matrix is considered. In such an embodiment, it is assumed that the demand between the k-th source-sink edge router pair (i,j) is given by $D_k$ or $D_{(i,j)}$, which is not necessarily equal to $d_k$ or $d_{(i,j)}$. It must be the case, though, that $D_k \geq d_k$. It should be noted that in this case the only modification to all of the linear programs depicted above, except the one defined by equations (1) to (4), is the replacement of $d_k$ by $D_k$ everywhere.

The linear program defined by equations (1) to (4) is for computing the network efficiency measure of the present invention before re-optimization. If a value for the network efficiency measure, r, is merely a guess, and the right hand side of the equation (3) is replaced by $D_k - d_k/r$, then $r(Dk-d_k/r)+d_k=rD_k$ amount of flow is routed for source-sink pair k for a solution of the new linear program of λ=r,. This implies that the network efficiency is equal to r and the initial guess for r was correct. However, for a solution to the modified linear program of λ≥r, the network efficiency before re-optimization must be equal to r*≥r, that is the initial guess for the r was too small. More specifically, since the amount of flow routed for commodity k is at least equal to $d_k$, only values of r for which $rD^k \geq d_k$ need to be considered. Or in other words $D_k - d_k/r \geq 0$. Note that the total amount of flow routed for commodity k is given by $\lambda(D_k-d_k/r)+d_k=rD_k+(D_k-d_k/r)(\lambda-r)$, which is greater than or equal to $rD_k$ if and only if λ≥r. Thus r*≥r if and only if λ≥r.

The result presented above suggests that r* may be computed by performing a binary search in the range of $[d_k/D_k, b]$ where b is the network re-optimization benefit measure as given by the linear program defined by equations (5) to (8) above.

In alternate embodiments, the present invention may further include an optional weight, $w_k$, associated with the k-th source-sink pair that indicates the relative benefit of routing more demand for this source-sink pair. The weighted sum of $\lambda_k w_k$ is determined where $\lambda_k$ is the $\lambda$ value assigned to the k-th source-sink pair. The ratio of the weighted sum after re-optimization to the weighted sum before re-optimization is compared to the re-optimization benefit threshold, $\alpha$, disclosed above. If the weighted sum ratio exceeds the re-optimization benefit threshold, $\alpha$, then re-optimization is performed. As before, a minimum cost re-routing is found that achieves the re-optimization benefit threshold of $\alpha$. This is accomplished by appropriately scaling down the $\lambda_k$ values associated with each source-sink pair after re-optimization such that the above defined ratio of weighted sums is substantially equal to the re-optimization benefit threshold, $\alpha$. The minimum cost re-routing finds a solution of minimum cost that routes $\lambda_k D_k$ flow for the k-th source-sink pair where $\lambda_k$ is the scaled down value associated with k-th source-sink pair. The actual re-routing of the LSPs is performed as previously described. The optional weighting function is implemented in various embodiments of the present invention for allowing a user to prevent the re-routing of paths that are considered as more important than others by the user or for creating a priority of which paths should be re-routed and in which order the re-routing should be performed.

The concepts of the present invention as described above rely on solving linear programs for certain multi-commodity flow problems however the use of linear program solvers is computationally prohibitive if the present invention is to be performed on devices with limited computational capabilities such as edge routers. Therefore, fast and efficient algorithms for solving the linear programs presented above may be used for performing certain aspects of the present invention. Such algorithms and their performance are described in "Faster and Simpler Algorithms for Multi-commodity Flow and other Fractional Packing Problems" Garg, N., and Konemann, J., *Proceedings of the 39$^{th}$ Annual Symposium on Foundations of Computer Science*, pp. 300-309, 1998, which is herein incorporated by reference in its entirety. The algorithms in Garg et al. may be directly applied to solve the linear program given by equations (1) to (4) to obtain the network efficiency, r, to within any specified error of the optimal value and to obtain the network re-optimization benefit measure, b, to within any specified error. The techniques presented in Garg et al. rely only on shortest path computations and hence are computationally efficient.

For the linear program given by equations (9) to (14) and the like, such linear programs may be transformed into a maximum weighted multi-commodity flow (MWMF) problem, such that the solution of the MWMF problem is a network efficiency very close to $r\alpha$ and with total profit at least as obtained by solving the linear program given by equations (9) to (14). As such, the techniques presented in Garg et al. may easily be interpreted to solve the maximum weighted multi-commodity flow (MWMF) problem using only shortest path computations on a specific network.

Figure 3:
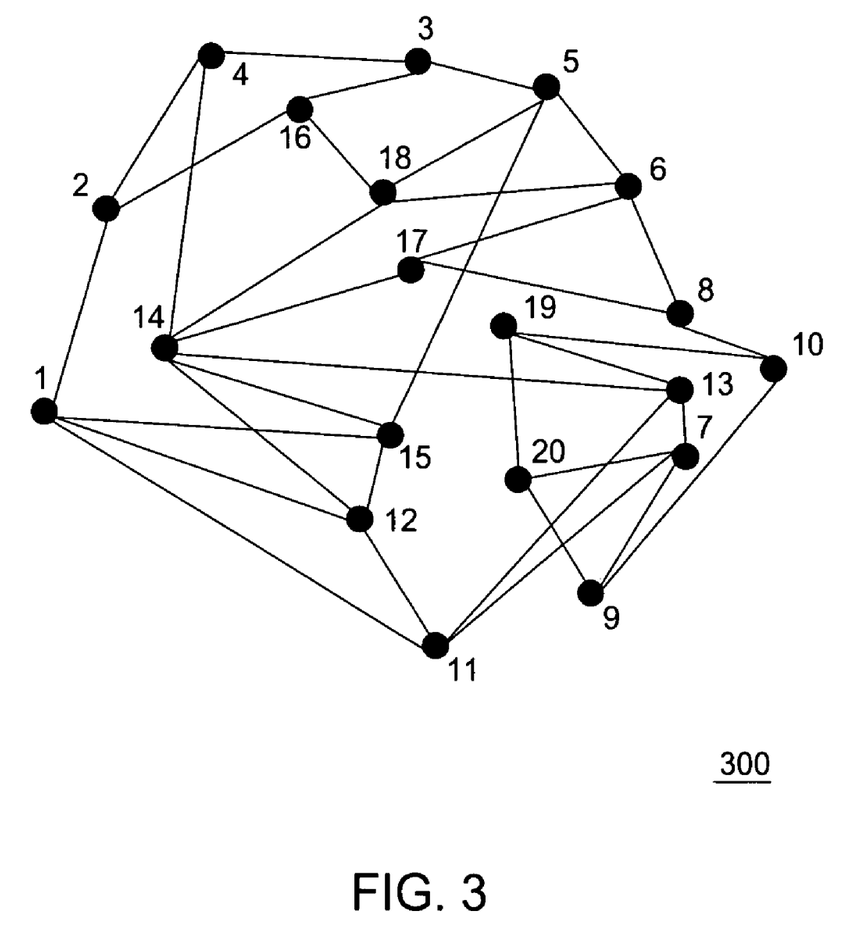
FIG. 3 depicts a high level block diagram of a simulated network wherein the concepts of the present invention are tested.

The inventors implemented a simulated network of 20 nodes for verifying the concepts of the present invention. FIG. 3 depicts a high level block diagram of a simulated network 300. The network 300 illustratively comprises 20 nodes (illustratively nodes 1-20) interconnected via a plurality of links. All of the links in the network 300 illustratively have 15 K of total available bandwidth. The network 300 comprises 6 source-sink pairs: (1,8), (11,6), (3,7), (5,12), (10,18) and (4,9). In the network 300, the requests for LSPs arrive in an online fashion and are routed using CSPF. The network efficiency is computed at different loading of the network 300. Each loading of the network 300 is considered to be a multiple of a basic loading matrix. In this basic loading matrix 10K of demand is routed for source-sink pair (1,8), 10K of demand is routed for source-sink pairs (11,6) and (5,12) and 12K of demand is routed for source-sink pair (3,7), (10,18) and (4,9). The network efficiency is observed at different loadings of the network each of which corresponds to a loading multiplier in the range from 0 to 16. For a given loading multiplier i, the demand routed between a given source-sink pair is i times the demand routed between the source-sink pair in the basic loading matrix.

For each loading of the network 300 (by CSPF) the network efficiency is computed and normalized for the basic loading matrix. That is if for a particular loading if the normalized network efficiency is equal to r, then the total demand that can be routed between a source-sink pair is r times the demand routed between the source-sink pair in the basic loading matrix and for some source-sink pair this bound is tight.

For the simulations in the network 300, $\alpha$=1.1. Thus, when the ratio of the network efficiency after re-routing exceeds the network efficiency before re-routing by a factor of 1.1, re-routing in accordance with the present invention is invoked.

Figure 4:
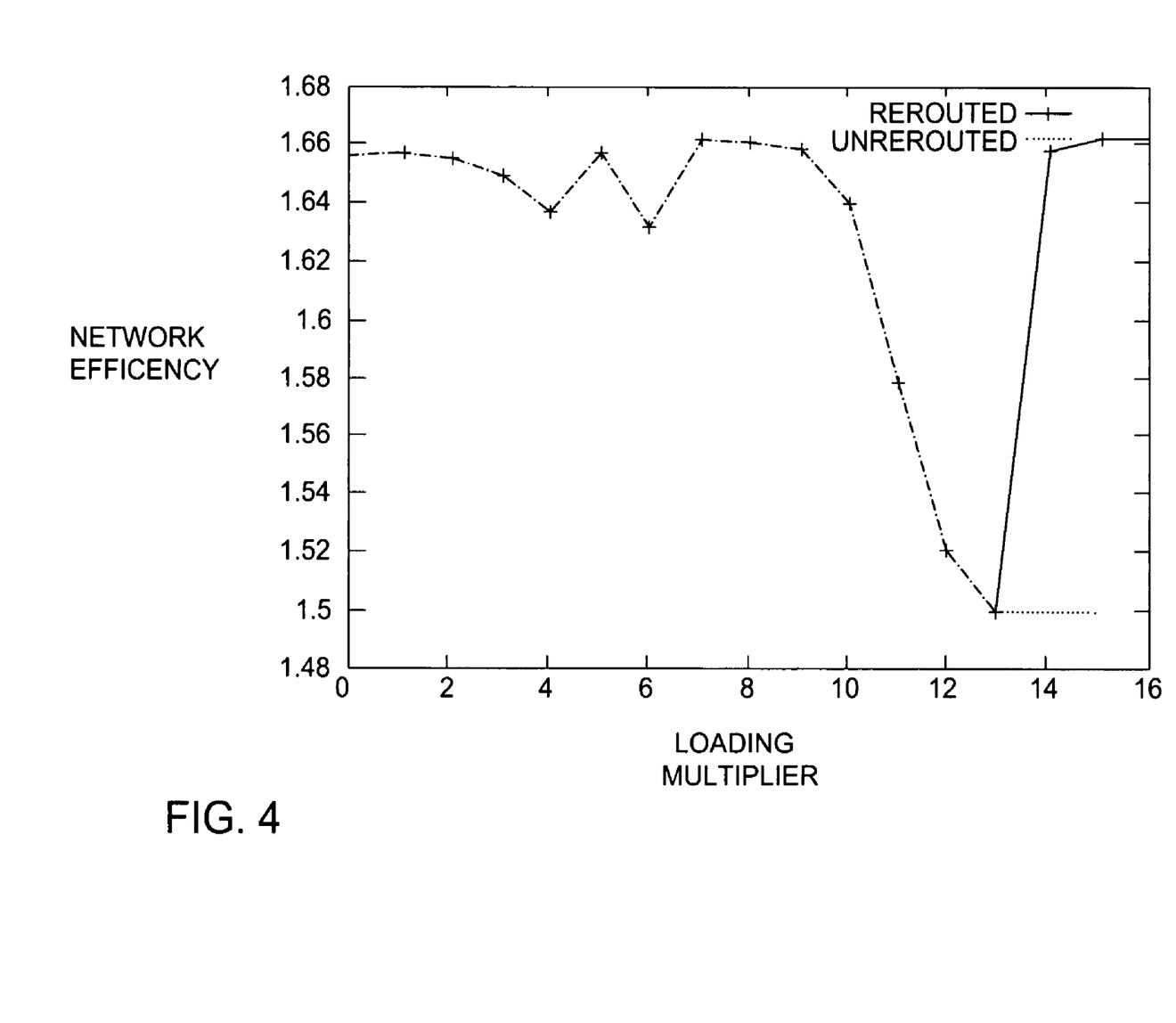
FIG. 4 graphically depicts the normalized network efficiency of the network of FIG. 3 before and after re-routing.

FIG. 4 graphically depicts the normalized network efficiency of the network 300 of FIG. 3 before and after re-routing. In FIG. 4, the X-axis depicts the loading multiplier, while the Y-axis depicts the normalized network efficiency both before and after re-routing. Note that the normalized network efficiency at loading multiplier 0 corresponds to the normalized network efficiency after re-routing, which is thus approximately 1.66. The re-routing is performed at network loading of 13 times the basic loading matrix, since at this point the normalized network efficiency of the loaded network is less than 1.1 times the normalized network efficiency at loading multiplier 0. Note that the re-routing raises the normalized network efficiency to 1.66 for a loading multiplier of 14. FIG. 4 also depicts that had the re-routing of the present invention not been performed, the network 300 would have stop admitting new LSPs at a loading which is 15 times the basic loading matrix. However by performing re-optimization in accordance with the present invention, the network stops admitting new LSPs at 16.5 times the basic loading matrix, resulting in a 10 percent improvement in the network performance.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method of network optimization, comprising:

Determining a network efficiency for a set of links of a source-sink pair;

Determining a network re-optimization benefit for said set of links; and

If a ratio of the network re-optimization benefit to the network efficiency is greater than a predetermined threshold, rerouting network sessions having at least one link in common with said source-sink pair to optimize a traffic flow wherein each source-sink pair of said network sessions is allotted a proportionate share of a total traffic flow;

Wherein a substantially minimum number of re-routings is performed to accomplish the network optimization.

2. The method of claim 1, further comprises weighting specific network sessions wherein a re-routing priority is generated for at least said specific network sessions.

3. The method of claim 2, wherein weighted network sessions are re-routed if necessary only after non-weighted network sessions have been re-routed.

4. The method of claim 1, wherein at least one of said network efficiency and said network re-optimization benefit is determined as a solution to a multi-commodity concurrent flow problem.

5. The method of claim 4, wherein said multi-commodity concurrent flow problem is solved using fast algorithms.

6. The method of claim 1, wherein the minimum number of re-routings needed to achieve optimization is determined using a cost-based method.

7. The method of claim 6, wherein the cost-based method is based on solving a budgeted version of a maximum concurrent flow problem.

8. the method of claim 7, wherein said maximum concurrent flow problem is solved using fast algorithms.

9. A network element, comprising a memory for storing information and program instructions, which, when executed by a processor, cause said network element to perform a method comprising:
Determining a network efficiency for a set of links for a source-sink pair;
Determining a network re-optimization benefit for said set of links; and
If a ratio of the network re-optimization benefit to the network efficiency is greater than a predetermined threshold, rerouting network sessions having at least one link in common with said source-sink pair to optimize a traffic flow wherein each source-sink pair of said network sessions is allotted a proportionate share of total traffic flow;
Wherein a substantially minimum number of re-routings is performed to accomplish the optimization.

10. The network element of claim 9, wherein said network element determines what currently provisioned sessions are on each path for each source-sink pair by passively peering into session sources.

11. The network element of claim 10, wherein said peering is accomplished using an Open Shortest Path First (OSPF-TE) protocol.

12. The network element of claim 9, wherein the minimum number of re-routings needed to achieve optimization is determined using a cost-based method.

13. The network element of claim 9, wherein said network element determines what currently provisioned sessions are on each path for each source-sink pair from information stored in a network management information base (MIB).

14. The network element of claim 9, wherein weighted routes establish a re-routing priority for the network sessions.

15. The network element of claim 14, wherein said weighting is determined by a user.

16. Computer-readable medium for storing a set of instructions, wherein when said set of instructions is executed by a processor perform a method comprising:
Determining a network efficiency for a set of links of a source-sink pair;
Determining a network re-optimization benefit for said set of links; and
If a ratio of the network re-optimization benefit to the network efficiency is greater than a predetermined threshold, rerouting network sessions having at least one link in common with said source-sink pair to optimize a traffic flow wherein each source-sink pair of said network sessions is allotted a proportionate share of total traffic flow;
Wherein a substantially minimum number of re-routings is performed to accomplish the network optimization.

17. The computer readable medium of claim 16, wherein said method further comprises weighting user defined network sessions wherein a re-routing priority is provided for at least said user defined network sessions.

18. A network, comprising:
A plurality of network elements, wherein at least one of said network elements comprises a memory for storing information and program instructions, which, when executed by a processor, cause said network element to perform a method comprising:
Determining a network efficiency for links of respective source-sink pairs in said network;
Determining a network re-optimization benefit for said respective links; and
If a ratio of a respective network re-optimization benefit to a respective network efficiency is greater than a predetermined threshold, rerouting respective network sessions having at least one link in common with said respective source-sink pair to optimize a traffic flow wherein each source-sink pair of said respective network sessions is allotted a proportionate share of a respective total traffic flow;
Wherein a substantially minimum number of re-routings is performed to accomplish the network optimization.

19. The network of claim 18, wherein said network sessions of said network are rerouted wherein substantially all of the source-sink pairs of said network are allotted a proportionate share pf a total network traffic flow.

* * * * *